Sept. 22, 1953     W. R. WALLMAN     2,653,039

VOUCHER CHECK

Filed March 2, 1950     2 Sheets-Sheet 1

Inventor:
William R. Wallman
By Fred Gerlach
Attorney

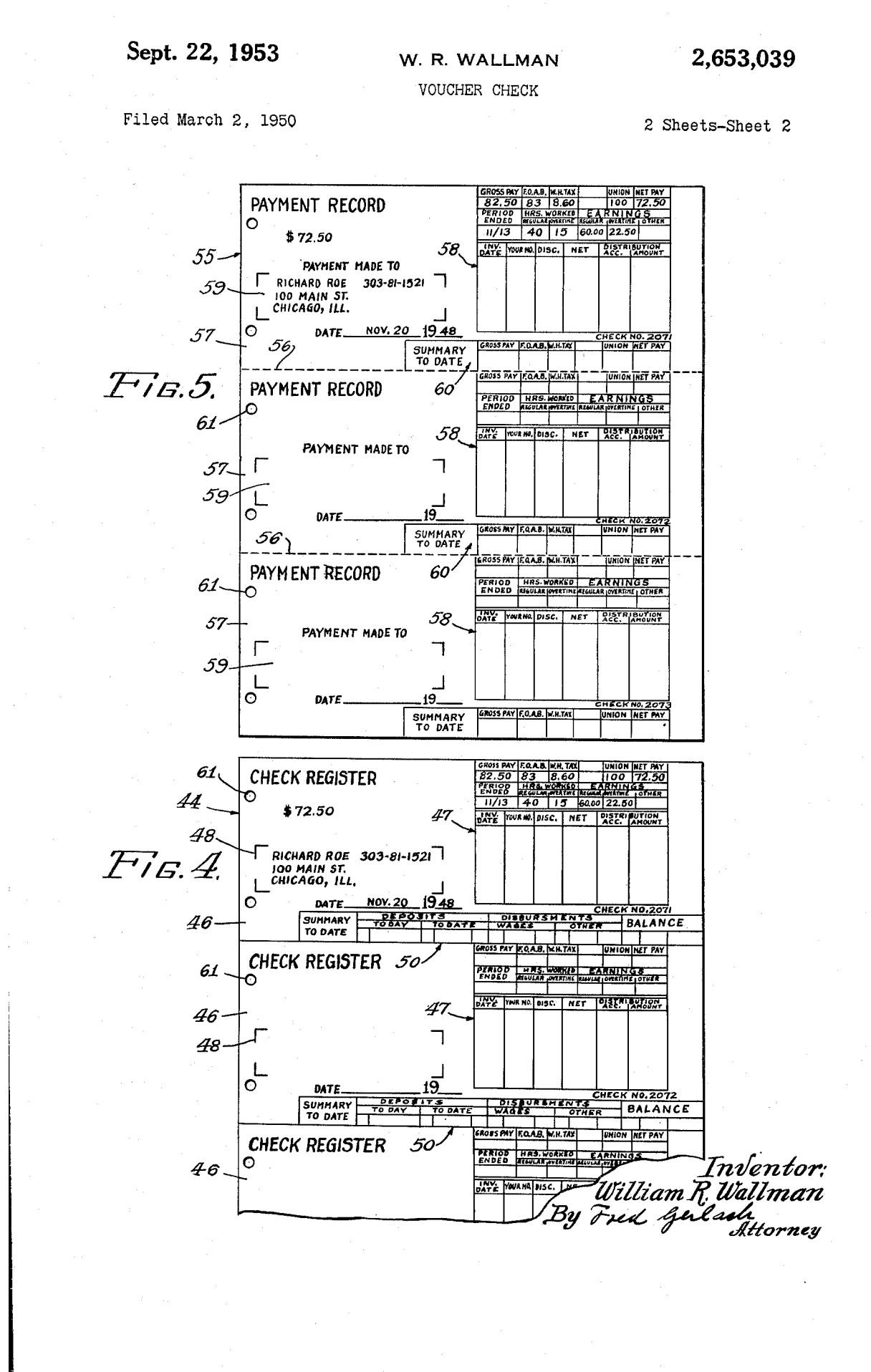

Sept. 22, 1953        W. R. WALLMAN        2,653,039
VOUCHER CHECK

Filed March 2, 1950        2 Sheets-Sheet 2

Inventor:
William R. Wallman
By Fred Gerlach
Attorney

Patented Sept. 22, 1953

2,653,039

UNITED STATES PATENT OFFICE 2,653,039

VOUCHER CHECK

William R. Wallman, South Bend, Ind.

Application March 2, 1950, Serial No. 147,277

2 Claims. (Cl. 282—27)

The invention relates to voucher checks.

One object of the invention is to provide a voucher check which is adapted to meet all the functional requirements of present day cash disbursements accounting with substantial economy in the cost of the forms and which is adapted for condensed duplication of the necessary entries made on both the check and stub on a record sheet of substantially the same area as the check without the stub.

Another object of the invention is to provide an assembly of sheets including a voucher check, a check register and a payment register, the check being provided with a stub on one of its ends which is foldable over the portion of the face of the check which contains no inserted data, and is provided on its reverse face with a form for entries of the particulars of the payment for which the check is issued, for duplicating the entries on the stub and the insertions on the exposed portion of the check on the check register and the payment register, the check register and the payment register for each check being substantially of the size of the check without the stub.

These objects are attained by providing a stub on and removable from one end of the check and provided on its back face with a form for the entries of the particulars of the payment, the stub being foldable over the check and of such dimension that it will not cover the portion of the face of the check having the insertions of the name of the payee and the amount of the payment and will overlie only the portion of the check which contains no inserted matter. As a result, the entries on the reverse face of the stub and the desired entries from the check may be simultaneously transferred to a duplicate sheet or sheets of the same dimensions as the overlying check.

Other objects of the invention will appear from the detailed description.

The invention consists in the several novel features hereinafter described and more particularly defined by claims at the conclusion hereof.

In the drawings:

Fig. 1 is a face view of a sheet of checks with the voucher stubs folded over one face of the checks with the entries made on one voucher stub and check;

Fig. 2 is a section taken on line 2—2 of Fig. 1 of an assembly of sheets for insertion into a typewriter;

Fig. 3 is a face view of a check with the voucher stub partially torn off the check;

Fig. 4 is a face view of a portion of the check register sheet;

Fig. 5 is a face view of a portion of the payment record sheet.

The invention comprises a sheet 10 which usually includes a vertical series of three like checks 11 with horizontal perforations 12 for severing the checks from one another. Each check has on its right-hand end a voucher stub 13 which is severable from the check on the line of a vertical series of perforations 15 at one end of the check and is foldable to overlie the right-hand portion of the check, as illustrated in Fig. 1. Each check has imprinted on its left-hand side-portion the check number, at 17, the payor's name, at 18, the word "Pay," at 19, with a line designation 24 for the insertion of the amount of the check, a designation 22 for the insertion of the name and address of the payee and a designation 23 for insertion of the date of the check. This printing and these designations are confined to the left-hand side portion of the check where they will be exposed for the insertions and will not be covered by the stub 13 when it is folded over the face of the check. The name of the payor may be printed on the upper central portion of the check. The line designation 24 is extended to the right-hand side of the check for insertion of the amount by a check protector. The name of the payor with an underlying line for the signature is printed at 25 on the right-hand side of the check. The designating number of the bank is printed at 26. The stub 13 when folded over the check overlies the right-hand portion of the check on which no insertions are to be made and leaves exposed the left-hand portion of the check on which the insertions are made.

The back or reverse face of the stub 13, when it is folded over the check will be visible and overlie the right-hand side portion of the check which contains no inserted matter and has printed thereon a form, generally designated 29, for the entry thereon of the particulars of or statistical data for the payment for which the check is drawn. Such form includes designated spaces for insertion of: the gross pay, at 30; old age or security tax, at 31; withholding tax, at 32; union dues, at 33; the net pay, at 34; the period covered by the payment, at 35; the hours employed, at 36; and overtime, at 37, which are the statistics relating to the payment when it is for wages. Below the area for these statistics, the form 29 includes designated columnar spaces for the insertion of the partciulars when the payment covers a purchase, such as the invoice date, at 38; the order number, at 39; the discount, at 40; the net amount, at 41; the account to which the payment is distributed, at 42, and the amount distributed, at 43. A designation 44 is provided at the right-hand lower corner of the stub for inserting the number of the check with which the stub is associated.

A check register sheet 44 for providing a chronological record of the checks drawn, corresponds in size to sheets 10 without the stubs 13. Each sheet 44 is adapted for duplication of entries from a sheet of checks, and has sections 46 indicated thereon, each of which has imprinted on its right side portion in position to register with the form 29 on the stub, a duplicate 47 of said form for receiving a transfer of the statistical data inserted on the voucher stub. At its left side portion each section 46 has a space 48 located to register with the corresponding designation 22 on a check 11 for receiving a transfer of the name and address of the payee, and a space for duplication of the date and amount paid. The insertions of the name and address and date on the check are transferred from the writing on the check to the check register. Along its lower margin each section 56 of the check register has printed thereon a form, generally designated 50, for the entry of the computed summary of payments, deposits, bank balances and payment distribution.

A payment record sheet 55 conforms in size to the check sheets without the stubs, and is horizontally perforated at 56 to provide severable sections 57 corresponding in size to the checks. Each section 57 has imprinted thereon a duplicate 58 of the form 29 on the stub of the check for duplication of the entries of the statistical data on the voucher stub and in position to receive a transfer of the insertions made on the voucher stub. Each section 57 also has a designated space 59 for receiving a duplicate impression of the name and address of the payee inserted on the check and a space for a duplicate impression of the date inserted on the check. Along its lower margin each section 57 has printed thereon a form 60 for consecutive entries of a summary or compilation from the wage statistics transferred to the form 58 from the form 29 on the check issued to the same payee.

The check sheets, check register sheets and payment record sheets constitute a sheet assembly adapted to meet all the functional requirements of present day cash disbursements accounting from the insertions made on the checks and stubs. Each section of the check register sheet 44 and each portion of the payment record 55 is provided with perforations 61 for subsequent binding.

In the use of the sheet-assembly, the voucher stub is folded over the check sheet 10, the check register sheet 44 and payment record sheet 55 are laid under the check sheet with their margins in registry, as shown in Fig. 2, with a carbon sheet 62 interlaid between the check sheet 10 and the check register sheet 44, and another carbon sheet 62 interlaid between the check register sheet 44 and the payment record sheet 55. This assembly is adapted for conjoint insertion in a typewriter for duplicating the insertions made on the check and stub on the check register and payment record. Preferably the sheets, when including three sections as shown, are substantially of letter size (8½" x 11½") when the stubs are folded over the checks so that the insertions may be made on a typewriter of standard width.

The name of the payee, address, the date of the check and the amount of the check are inserted usually by a typewriter on the exposed portion of the check sheet 10 and duplicated on the check register sheet 44 and the payment record sheet 55. The statistical data and check number will be inserted on the voucher stub 13 and duplicated on the corresponding forms on the check register and the payment record. As a result, all the insertions on the check and the stub will be duplicated in side-by-side relation on the check register and the payment record. Each stub will then be folded under or to one side of the check to which it is attached so that the amount of the check can be inserted on the line 24 by a check protector and the check can be completed by the signature. Each completed check with a voucher attached will be transmitted or delivered to the payee who will detach and retain the stub and deposit or cash the check.

The deposits, payments, bank balance and the class of the disbursement will be entered and calculated on the form 50 on each section of the check register sheet and the amounts may be carried forward consecutively. These check register sheets provide a chronological record of the checks drawn, deposits, bank balances, and the class of disbursement and may be kept in consecutive order.

The summaries of wage payments and data may then be calculated and entered on the form 60 on the lower portion of each section of the payment record from the entries on the form 58. The sections of the payment record are then torn apart for classified or indexed filing.

The assembly of sheets described provides (1) a check for the payee with a voucher specifying the particulars of the payment for which the check is drawn; (2) a chronological record of checks drawn with provision for calculating and recording current bank balances; and (3) the unit media necessary for compiling wage and salary earnings, social security and withholding tax statistics, accounting distributions and maintaining an alphabetical cross-index of payments other than wages as a preventative against duplicate payments.

Characteristics of the combined bank check and voucher stub, for which safety paper is used, are that the area of the stub is approximately one-half of the area of the check to effect a saving of such paper, the sheet assembly satisfies all the functional requirements of present day cash disbursements accounting and the writing may be done on a typewriter of standard width.

While it is preferable to imprint the data on the check and the voucher stub for transfer of entries to the check register and payment record, the same result may be accomplished by making the insertions on either of the other sheets with carbon sheets arranged for such transfer.

The invention is not to be understood as limited to the details described, since these may be modified within the scope of the appended claims without departing from the spirit and scope of the invention.

Having thus described my invention, what I claim as new and desire to secure by Letters Patent is:

1. A combined bank check and voucher and record keeping device comprising: an imprinted check of a predetermined area with designations on one of its side portions for insertion of the name of the payee and the amount to be paid, a voucher stub extending sidewise from and detachable from the end of the opposite side of the check, foldable sidewise to overlie the contiguous side portion of the check and terminating in its overlying position so as to expose the insertions made on the check on the first named side portion and provided on its face which is exposed when it is folded over the check, with a form for entries of statistical data relating to the payment, a record sheet of substantially the same area as and provided with the designations corresponding to and underlying those on the exposed portion of the check, and with a form corresponding to and underlying the form on the stub, and means for duplicating the entries made on the check through the check onto said record sheet and duplicating the entries made on the stub through the stub and the check onto the record sheet without duplicating on the check the entries made on the stub.

2. In a bank check and voucher and record keeping device, the combination of a check sheet of predetermined dimension having designations in one end portion for insertion of the payee and amount of the check, a voucher stub detachably fixed to the other end portion of the check sheet and dimensioned to overlie only said other end portion of the check sheet leaving the first end portion uncovered when in position of use, said stub having a form for entry of statistical data relating to payment on the exposed face of the stub when in position overlying the check sheet, a record sheet underlying the check sheet substantially throughout its area and having designations corresponding to and underlying those on the uncovered portion of the check sheet and a form corresponding to and underlying the form on the voucher stub when in position of use, and means for duplicating the entries made on the check sheet and on the stub sheet onto the record sheet.

WILLIAM R. WALLMAN.

References Cited in the file of this patent

UNITED STATES PATENTS

| Number | Name | Date |
|---|---|---|
| 2,112,456 | Fisher | Mar. 29, 1938 |
| 2,262,251 | Rhoades | Nov. 11, 1941 |
| 2,292,681 | Anderson | Aug. 11, 1942 |
| 2,536,371 | Hutchinson | Jan. 2, 1951 |